(12) United States Patent (10) Patent No.: US 9,730,066 B2
Li et al. (45) Date of Patent: Aug. 8, 2017

(54) MOBILE APPLICATION IDENTIFICATION AND CONTROL THROUGH WIFI ACCESS POINTS

(71) Applicant: SYMANTEC CORPORATION, Mountain View, CA (US)

(72) Inventors: Qing Li, Cupertino, CA (US); Gregory S. Clark, Sunnyvale, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 146 days.

(21) Appl. No.: 13/857,002

(22) Filed: Apr. 4, 2013

(65) Prior Publication Data

US 2014/0273950 A1 Sep. 18, 2014
US 2016/0127906 A9 May 5, 2016

Related U.S. Application Data

(60) Provisional application No. 61/800,510, filed on Mar. 15, 2013.

(51) Int. Cl.
| | |
|---|---|
| *H04W 12/08* | (2009.01) |
| *G06F 3/0481* | (2013.01) |
| *H04W 24/08* | (2009.01) |
| *G06Q 50/18* | (2012.01) |
| *H04L 29/06* | (2006.01) |
| *H04W 84/12* | (2009.01) |

(52) U.S. Cl.
CPC .......... *H04W 12/08* (2013.01); *G06F 3/0481* (2013.01); *H04W 24/08* (2013.01); *G06Q 50/184* (2013.01); *H04L 63/0263* (2013.01); *H04L 63/18* (2013.01); *H04W 84/12* (2013.01)

(58) Field of Classification Search
CPC . H04W 12/08; H04L 9/00; H04Q 7/00; G06F 21/00
See application file for complete search history.

(56) References Cited

U.S. PATENT DOCUMENTS

| | | | | |
|---|---|---|---|---|
| 2006/0153122 | A1* | 7/2006 | Hinman | H04L 63/10 370/328 |
| 2006/0174028 | A1* | 8/2006 | Zhu | H04L 63/1408 709/232 |
| 2008/0098475 | A1* | 4/2008 | Girouard | G06F 21/554 726/21 |
| 2008/0098478 | A1* | 4/2008 | Vaidya | G06F 21/34 726/24 |
| 2009/0282485 | A1* | 11/2009 | Bennett | G06F 21/51 726/24 |
| 2010/0199325 | A1* | 8/2010 | Raleigh | G06F 21/53 726/3 |
| 2012/0311659 | A1* | 12/2012 | Narain | H04W 12/08 726/1 |
| 2013/0031599 | A1* | 1/2013 | Luna | G06F 21/554 726/1 |

\* cited by examiner

*Primary Examiner* — Myron K Wyche
(74) *Attorney, Agent, or Firm* — Maschoff Brennan

(57) ABSTRACT

A network access point secures a WiFi network, and acts as a picocell, by identifying applications running on computer-based devices, such as mobile phones, tablet computers, and the like, that seek to access the Internet (or another network) via the access point and applying network access policies to data communications by those applications according to application, location, context, device and/or user characteristics.

13 Claims, 3 Drawing Sheets

US 9,730,066 B2

MOBILE APPLICATION IDENTIFICATION AND CONTROL THROUGH WIFI ACCESS POINTS

RELATED APPLICATIONS

This is a NONPROVISIONAL of, claims priority to and incorporates by reference U.S. Provisional Application No. 61/800,510, filed 15 Mar. 2013.

FIELD OF THE INVENTION

The present invention relates to WiFi access points configured to identify applications running on computer-based devices, such as mobile phones, tablet computers, and the like, and to apply network administrator-directed policies to data communications by those applications according to application, location, context, device and/or user characteristics.

BACKGROUND

The ubiquity of computer-based mobile devices, such as mobile phones, tablet computers, laptop computers and the like, equipped with wireless networking capabilities (e.g., WiFi, IEEE 802.11, wireless networking capabilities) along with deployment of wireless network access points that permit such devices to access the Internet or other computer network has given mobile professionals, consumers, students and others the ability to send and retrieve information from thousands, if not tens of thousands, of locations, both public and private. While offering great freedom to the users of such devices, these developments have created challenges for enterprise information technology managers, security professions and others. For example, enterprises that permit employees to use personal mobile devices on corporate networks not only are faced with challenges related to the bandwidth consumption of those devices, but also the very real possibility that the devices might serve as conduits to inappropriately transfer sensitive company materials outside of the corporate network. Even for company-issued mobile devices, IT managers have little or no visibility into applications running on those devices and so cannot, with certainty, determine whether any are being used for improper purposes.

One solution to this problem is to install agent software that runs on the mobile device. The agent may act as a watchdog and report on activities that it deems to be suspicious or inappropriate. Or, in some instances, agents may forbid the use of certain applications on a device or the transfer of certain materials outside of a corporate network. The use of such agent software is not, however, an ideal solution. For example, because so many devices exist, it can become a significant problem for an IT department to try and maintain all of the different agents that would be necessary within any enterprise of size. Further, if personal devices are permitted within the corporate environment, it becomes virtually impossible to police the use of such agents on those devices. Most software agents of the kind being described can be disabled at the device user's option, making such agents a rather ineffective means of securing a network. Further, even if it were possible to insist on the use of such software agents to access a corporate network, many mobile devices include alternative off-device data paths, for example, via cellular radio communications, and the agents that police data network usage would be irrelevant when such paths are employed.

SUMMARY OF THE INVENTION

In various embodiments, the present invention provides network access points configured to identify applications running on computer-based devices, such as mobile phones, tablet computers, and the like, and to apply network administrator-directed policies to data communications by those applications according to application, knowledge about the application (such as the identity and the origin of the publisher), security rating of the publisher, application category, popularity, known released versions, variants, past history of known compromises and rate of compromise, attributes (such as whether the application employs encryption technology for its data traffic), location, context, device and/or user characteristics. In one such example, a network access point includes a processor and a memory, the memory storing processor executable instructions which, when executed by the processor, cause the processor to enforce network access policies against data communications seeking to access a computer network via the network access point over a wireless communication channel. The network access point may be a WiFi network access point and the wireless communication channel may be a WiFi communication channel.

The network access point may also include a cellular radio frequency communication transceiver and the memory may store instructions that when executed by the processor cause the processor to instruct the cellular radio frequency communication transceiver to block attempts to access the computer network via a cellular radio frequency communication channel.

The network access policies may be based on one or more of identification of an application seeking to access the computer network via the network access point, identification of a device seeking to access the computer network via the network access point, identification of a context within which the network access point is deployed, and identification of a user seeking to access the computer network via the network access point. Identification of the application may be based on signatures associated with the application, which signatures may be periodically updated from a remote server.

In a further embodiment of the invention, a WiFi computer network communicatively coupled to a second computer network is secured through enforcement, at a WiFi network access point deployed between the WiFi network and the second computer network, of network access policies, said policies dependent upon one or more of identification of an application seeking to access the second computer network via the network access point, identification of a device seeking to access the second computer network via the network access point, identification of a context within which the network access point is deployed, and identification of a user seeking to access the second computer network via the network access point. Upon detecting abnormal application or device behaviors, the network access point may issue an alert to a user of a mobile device associated with an application accessing or seeking to access the second computer network via the network access point. By way of example, such an abnormal application behavior may be indicative of malware behavior.

In various embodiments, context-dependent policy enforcement includes location-dependent policy enforcement. Further, the WiFi network access point may report to a server communicatively coupled thereto, one or more of identifications of applications seeking to access the second computer network via the network access point, signatures of applications seeking to access the second computer network via the network access point, and behaviors of applications seeking to access the second computer network via the network access point. Alternatively, or in addition, the WiFi network access point may receive from a server communicatively coupled thereto, one or more of application signatures and behaviors of applications for use in connection with policy enforcement decisions regarding applications seeking to access the second computer network via the network access point.

The WiFi network access point may be configured to prevent out-of-band data communications from within a network coverage zone of the WiFi network access point from bypassing policy enforcements by the network access point. In this context, out-of-band data communications may be considered as any data communications through a channel other than a WiFi communication channel for which the network access point provides policy enforcement. In some cases, preventing the out-of-band data communications from bypassing policy enforcements comprises subjecting the out-of-band data communications to said policy enforcements.

These and further embodiments of the invention are described in greater detail below.

BRIEF DESCRIPTION OF THE DRAWINGS

The present invention is illustrated by way of example, and not limitation, in the figures of the accompanying drawings in which.

DETAILED DESCRIPTION

Figure 1:
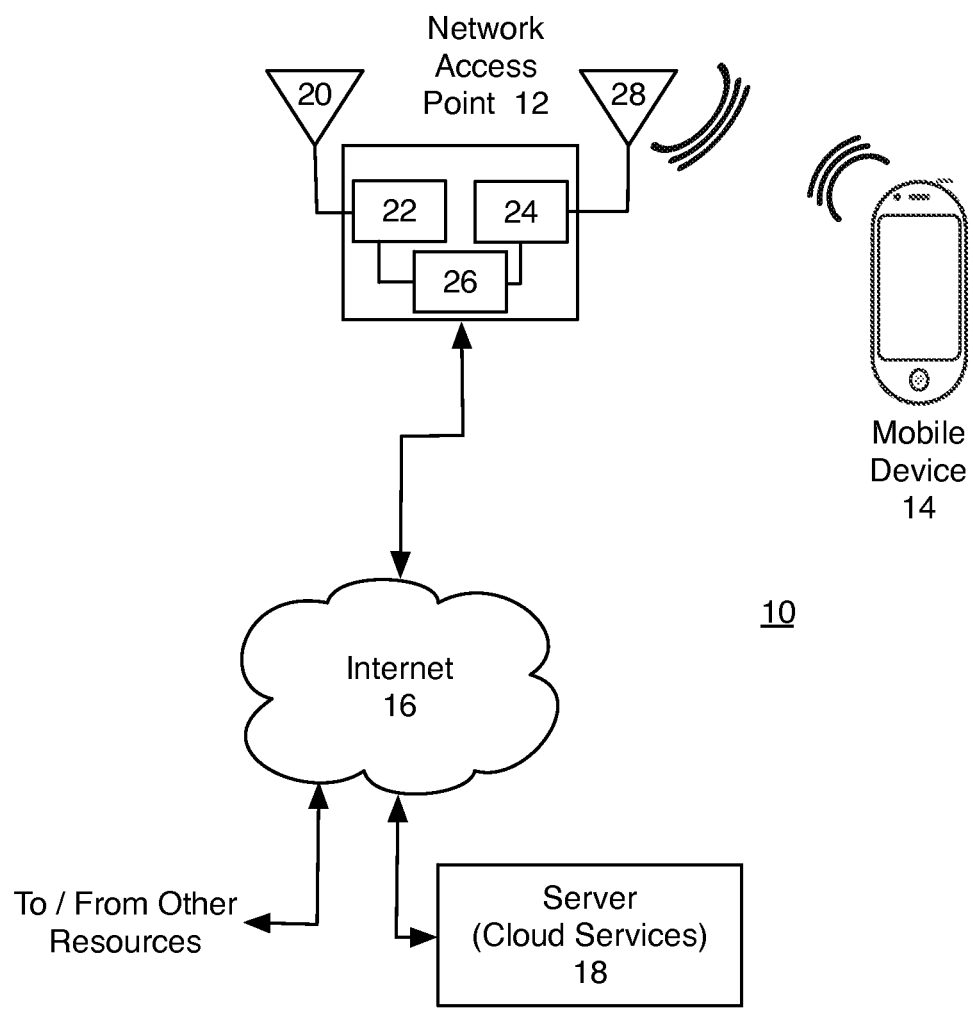
FIG. 1 illustrates a network environment suitable for deploying a network access point configured in accordance with embodiments of the present invention.

Described herein is a network access point, in one embodiment a WiFi access point, configured to identify applications running on computer-based devices, such as mobile phones, tablet computers, and the like, and to apply network administrator-directed policies to data communications by those applications according to application, location, context, device and/or user characteristics. In some embodiments, the network access point includes radio frequency communication means that precludes data communications between devices within a network coverage zone of the access point via communication paths that are not subject to the policy enforcement. For example, in one embodiment, a WiFi access point includes cellular radio frequency communication means that precludes data communications over cellular radio channels, thus forcing devices operating within a network coverage zone of the WiFi access point to channel all data communications through a WiFi communication channel that is subject to the administrator-defined policy enforcement. In other instances, the network access point may apply policies to all network access channels, including WiFi and cellular (e.g., 3G, 4G, LTE, etc.) communication channels.

The present network access point, in various embodiments, is configured to identify and control applications running on computer-based devices seeking to access a computer network (e.g., the Internet) via the access point. In one embodiment, the identification and control capability is applied especially to applications running on mobile computer-based devices, such as smartphones, tablet computers and the like, but other applications running on other computer-based devices (such as laptop computers, desktop computers, etc.) may also be recognized and controlled. The network access point may be a WiFi access point and may store user information so as to be able to authenticate users at connection time and associate the user with a particular device identifier, such as a device MAC address. Further, the access point may be configured to associate either or both of the device and/or user with one or more applications running on the device so as to track user and/or application behavior. Thus, a network access point configured in accordance with the present invention may be configured to enforce policies (e.g., network access policies, data transmission and/or reception policies, or other network activity policies, or, more generally, security policies and/or quality of service policies) according to device MAC address, user name, application, application behaviors or any combinations of these characteristics. In still further instances, the network access policies may be based on information provided by an age or content-based rating system which, for example, may provide rating or similar information directly to the network access point or to a command and control center communicatively coupled to a plurality of such network access points (e.g., for ultimate distribution to the network access points in the form of policies).

In various embodiments, the network access point may be configured to alert a user, e.g., through in-band or out-of-band communications, if it determines that an application running on the user's computer-based device is or may be operating in a malicious or suspicious manner. For example, in-band communications may include pop-up or other messages displayed via a web browser running on the computer-based device. Out-of-band communications may include text (e.g., short message service) messages to a mobile device (such as a smartphone or tablet computer). Examples of applications that trigger such alerts may include mobile applications that include or may include malware or those that have high threat levels (e.g., for transferring personal or financial information off device over public networks).

The present network access point may configure and enforce policies according to one or more of application categories, time of day, application behaviors, device type, user identification, and/or other characteristics. For example, a network access point may track mobile application behavior over a period of time and send an alert if abnormal traffic patterns with respect to the application are observed. If, for example, "routine" application behavior is characterized by small uploads and variable sized downloads (as may be expected of a web browser, etc.), then upon seeing an attempt to upload a large file, the network access point may initiate an alert as the new behavior is an abnormal traffic pattern that may be indicative of an attempt to upload personal information of a user from the device without the user's knowledge.

Policy enforcement is governed by security and quality of service policies that may be updated or modified from time to time. Accordingly, the network access point is communicatively coupled to one or more servers (which may be configured as a "cloud-based" service) from which updated policy information and updated information on applications can be obtained (using either or both of a pull or push model). The communicative coupling to the server(s) also gives the network access point the ability to transfer information off-device so that application identification and/or classification operations can be performed at the server(s) and corresponding policies returned to the network access point. This allows for real time (or near real time) updates to application signature databases (so that new or compromised applications can be identified) and application behaviors tracked (to better allow for identification of malicious or suspicious behaviors). The communicative coupling to the server(s) allows the network access point to contribute data to a "cloud-based" analytics engine that may also be coupled with other such network access points which collectively enable the "cloud-based" analytics engine to obtain a global view on application and user behaviors. Alternatively, or in addition, the network access point may be communicatively coupled to one or more servers that provide web address (e.g., uniform resource locator (URL)) and/or content categorization services, which can be used in connection with policies that restrict access to various kinds of web sites, etc. For example, in an enterprise setting, or in the home, network administrators (or parents) may wish to restrict access to Web sites known to include adult-oriented content. By communicating with off-device URL or other categorization services, the present network access point can intercept network addresses, refer them to off-device classification services, and receive a report regarding the classification for the intended destination. If that destination is one that is prohibited by one or more policies currently being enforced, the network access point can deny access to the requesting device/application.

FIG. 1 illustrates a basic network environment 10 in which a network access point 12 that is configured in accordance with embodiments of the present invention may be used. Network access point 12 may be a WiFi access point configured to provide the application identification and policy enforcement facilities discussed herein. As such network access point 12 serves as a gateway for computer-based devices, such as mobile device 14, to access the Internet 16 and resources (e.g., Web servers, databases, enterprise networks, etc.) accessible through the Internet. Mobile device 14 may be a smartphone, tablet computer, laptop computer or other mobile device. In other instances, the computer based devices that access the Internet via network access point 12 may include both mobile and desktop devices, such as desktop computers, file servers, storage servers, or other devices. For ease of discussion the remainder of this disclosure will assume the computer-based device accessing network access point 12 is a mobile device 14, but readers should understand that the present invention is not limited to such instances. Also, it should be noted that Internet 16 is shown as a single network but in reality is comprised of networks of networks and the single illustrated network may, in some instances, include corporate or home local area networks. The use of a single network in the drawing is for illustration purposes only and should not be read as limiting the invention to such configurations.

Mobile device 14 may be equipped with multiple data channel communication means. For example, in the case of a smartphone or tablet computer, it is common for such devices to have both WiFi radios and cellular radio frequency radios. The device may have an operating system that favors communication over one channel or the other depending on network conditions, availability of WiFi communication channels, and/or other preferences, and the user of the mobile device may be able to mandate the use of one channel or the other either through device preference configuration or manually disabling one or the other communication means.

In order to ensure that data communications between mobile device 14 and Internet 16 (e.g., resources available there through) pass through a channel that provides policy enforcement, network access point 12 includes cellular radio frequency communication circuitry 22, including antenna 20. In one embodiment, the cellular radio frequency communication circuitry 22 acts as a local cellular communications hot spot and intercepts all cellular communications within a network coverage zone. By examining the signaling associated with the intercepted cellular communication, circuitry 22 can determine whether an attempted cellular communication from a mobile device 14 is a voice call or a data call. If it is a voice call, it is allowed to proceed. However, if it is a data call it is either blocked, or allowed to proceed subject to the policy enforcement provided by policy enforcement engine 26, as described further below.

In another embodiment, cellular communications circuitry 22 acts as a local cellular radio jamming station, preventing cellular communications from within a network coverage zone. In some instances the circuitry may be configured to jam attempted data communications over cellular networks (e.g., 3G, 4G, or other cellular networks) but permit voice communications. By jamming the cellular data channel communication path, network access point 12 ensures that data communication to/from mobile device 14 must pass though its associated WiFi communications radio 24, which ensures that the data communications are subject to policy enforcement by policy enforcement engine 26. In still further embodiments additional wireless communication channels, for example Bluetooth communication channels, WLAN communication channels, etc., may be handled in similar fashion.

In another embodiment, cellular communications circuitry 22 acts as a local cellular station, similar to a "picocell". In some instances the circuitry may be configured to force attempted data communications over cellular networks (e.g., 3G, 4G or other cellular networks) through circuitry 22. By forcing the cellular data channel communication path through circuitry 22, network access point 12 ensures that data communication to/from mobile device 14 is subject to policy enforcement by policy enforcement engine 26. Forcing cellular communications through the policy enforcement channel allows the network access point to collect information concerning user behaviors, which information (or alerts regarding abnormal instances thereof) may be provided to a cellular carrier. For example, the network access point may provide user behavior information to a command and control facility for the network access point where it may be processed (e.g., compared) with past instances of user behavior. If abnormal usage behaviors are noted, the cellular carrier may be notified and, in turn, the carrier may notify the registered owner of the subject device (for which the abnormal usage behaviors were identified) as a means of cautioning against possible theft or misuse of the device, etc.

Assuming that mobile device 14 is attempting to access the Internet (or resources available there through) via the WiFi communication channel associated with network access point 12, all data communications over that channel will be subject to policy enforcement at the network access point. Policy enforcement begins with application identification. The policy enforcement engine is configured to identify applications based on an application signature. Application signatures may involve one or more packets or information derived from one or more packets, such as header information and payload. The signature analysis may be quite involved, allowing the policy enforcement engine to determine particular operations being attempted by applications, or not, in which case mere application identification alone may be all that is possible. Over time, application signatures can be captured and provided to cloud services computer 18 for storage and further analysis and cloud services computer 18 can provide more detailed signature profiles back to network access point 12 for use in future identification operations.

In addition to application identification, the network access point can identify the individual mobile device 14 with which it is communicating, for example on the basis of a device MAC address, International Mobile Equipment Identity (IMEI) number or other unique identifier that is included in either the WiFi or cellular communication handshakes or in other traffic passing between the devices. Thus, policy enforcement engine can associate individual applications (identified by their signatures) with the device on which they are running (identified by MAC address or other unique identifier). This allows the policy enforcement engine to create and enforce policies at the level of the application, the device or a combination of application and device. For example, certain devices, e.g., those which are not company issued devices for which the MAC addresses are known, may be prohibited from accessing company-related computer-based resources via the network access point 12. Or, certain applications, such as applications associated with remote file storage, may be prohibited from uploading information, while downloading information may be permitted. Still further, certain applications when run on company-issued devices may be permitted full access while the same application running on a personal device may be prohibited from accessing the network or be required to operate with limited functionality.

In addition to device and/or application-related policy enforcement, the policy enforcement engine may be configured to enforce user-level policies (e.g., in lieu of or in addition to application and/or device policies). User information may be determined by any of several means, including but not limited to user login information when initiating contact with the access point. For example, users are familiar with having to log-in to public access points at airports, hotels and other venues, either by providing account credentials, room numbers or other identifying information. Based on such information, policies can be enforced by the network access point (either as a sole criteria or in combination with one or more other criteria such as application, application type, application category, device type, device category, device identification, etc.).

It should be noted that once identified by its signature, an application can be categorized (e.g., as a game, a productivity application, a financial services application, etc.) and/or typed (e.g., as a high risk, moderate risk, or low risk application). Risk levels (types) may be assigned on the basis of third party information regarding the prevalence of malware of other risk factors associated with an application. For example, some game applications are widely pirated and look-alike games that are really just malware in disguise are often distributed to unsuspecting consumers. These malware-games may seek to extract personal information of a user from a device and transmit it (commonly known as "phone-home" behavior) to a waiting server (commonly known as a command and control center). By identifying the application and recognizing it as a high-risk application, the present network access point can prevent the game from connecting to the Internet over a WiFi channel and can also alert the user to the potential threat.

Context is also a criterion by which the network access point can make policy enforcement decisions. For example, the network access point may be context- or location-aware and recognize the environment in which it is deployed. This may be on the basis of preconfigured information stored in memory or on the basis of location determination provided via network information or, in some cases, global positioning system information. Networks access points that are deployed as gateways to the Internet in public areas (e.g. coffee shops, airports, hotels, conference facilities, etc.), may be configured to enforce policies differently than similar network access points that are deployed within corporate Local area networks or home networks. Thus, policy templates that are developed for and deployed to the network access points may have context or location parameters that trigger different applications of the policy. Alternatively, different policy templates may be deployed with network access points intended for different market segments.

Figure 2:
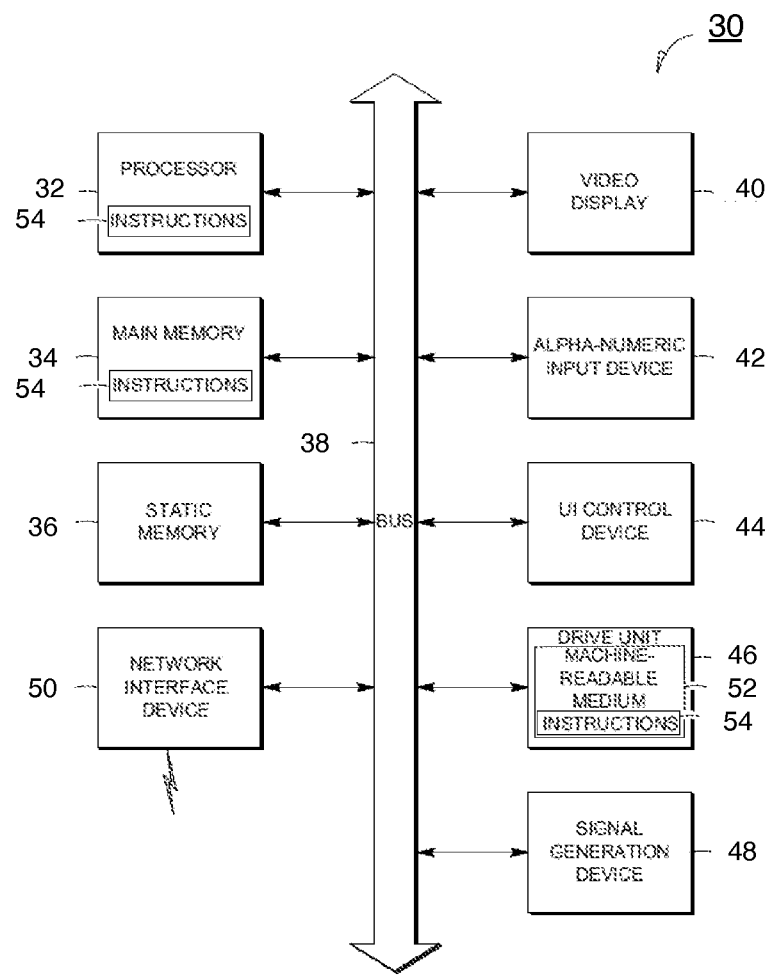
FIG. 2 illustrates a computer system which may embody a network access point configured in accordance with embodiments of the present invention.

FIG. 2 shows a diagrammatic representation of a computer system 30 within which a set of instructions for causing the computer system to perform any one or more of the methods, processes, operations or methodologies discussed herein may be executed. In some examples the computer system 30 may be network access point 12 or include one or more of the components of network access point 12. In addition, the computer system 30 may represent a server or a client machine which is accessed by or accesses the network access point 12. Thus, the computer system 30 may be a personal computer, a tablet computer, a set-top box, a personal digital assistant, Web appliance, desktop computer, laptop computer, cellphones, smartphones, computer game console, portable computer gaming console, media player, portable media player, other mobile devices and the like, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems that are linked (e.g., either by hardwired, wireless, or a combination of hardwired and wireless connections) through a network, both perform tasks. In a distributed system environment, program modules may be located in both local and remote memory-storage devices (see below).

The example computer system 30 includes a processor 32 (e.g., a central processing unit (CPU), a graphics processing unit (GPU) or both), a main memory 34 and a static memory 36, which communicate with each other via a bus 38. The computer system 30 may further include a video display unit 40 (e.g., a liquid crystal display (LCD)). In the case of a network access point, the LCD display may present user or administrator level information useful to determine operating state, fault conditions, etc. Configuration menus may also presented via such a display and, in the case of a touch screen display user selections may be entered by such means. Alternatively, user selections may need to be entered via one or more hard buttons or other user interface elements.

The computer system 30 may also include an alphanumeric input device 42 (e.g., a keyboard), a user interface (UI) controller 44 (e.g., a mouse, hard buttons, etc.), a disk drive unit 46, a signal generation device 48 (e.g., a speaker) and one or more network interface devices 50 (e.g., a WiFi and/or cellular radio frequency transceiver). The disk drive unit 46 includes a machine-readable medium 52 on which is stored one or more sets of instructions 54 and data structures (e.g., software) embodying or used by any one or more of the methodologies or functions illustrated herein. The software may also reside, completely or at least partially, within the main memory 34 and/or within the processor 32 during execution thereof by the computer system 30, with the main memory 34 and the processor 32 also constituting machine-readable media. As used herein, the term machine-readable medium should be taken to include a single medium or multiple media (e.g., a centralized or distributed database, and/or associated caches and servers) that store the one or more sets of instructions. The term machine-readable medium should also be taken to include any tangible medium that is capable of storing, encoding, or carrying a set of instructions for execution by the machine and that cause the machine to perform any of the one or more of the methodologies illustrated herein. The term machine-readable medium shall accordingly be taken to include, but not be limited to, solid-state memories, and optical and magnetic medium.

Figure 3:
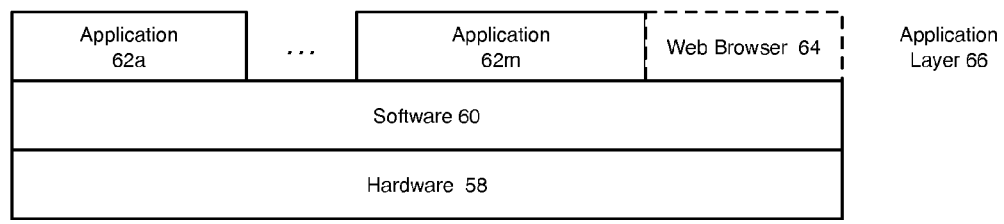
FIGS. 3 and 4 illustrate software architectures of network access points configured in accordance with embodiments of the present invention.

FIG. 3 illustrates a computer system 56 from the point of view of its software architecture. Computer system 56 may be any of the client or server devices described above or, with appropriate applications comprising a software application layer 66, may be a network access point as described herein. The various hardware components of computer system 56 are represented as a hardware layer 58. An operating system 60 abstracts the hardware layer and acts as a host for various applications 62a-62m, that run on computer system 56. The operating system may host a web browser application 64, which provides access to the Internet for a client device such as mobile device 14, etc.

Figure 4:
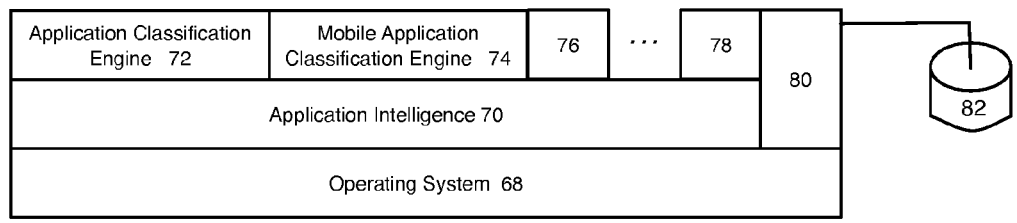

FIG. 4 illustrates in further detail a software architecture for a policy enforcement engine such as engine 26 described with respect to FIG. 1. Operating system 68 of the network access device 12 abstracts its hardware layer (not shown) and hosts (among other components) an application intelligence layer 70. The application intelligence layer includes an application classification engine 72 (for non-mobile device applications) and a mobile application classification engine 74 (for mobile device applications). As discussed above, these engines are responsible for identifying applications seeking to access computer resources via the network interface device 12 by their signatures. The application intelligence layer also includes risk assessment modules 76, and one or more other assessment modules 78. Network interface device 12 further includes the policy enforcement module 80 that is responsible for enforcing policies based on assessments made by the various application intelligence layer modules and policy templates provided via a policy database 82.

Certain embodiments are described herein as including logic or a number of components, modules, or mechanisms. Modules or components may constitute software modules (e.g., code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors, including processor 32, may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations. Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connects the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some example embodiments, the processor or processors may be located in a single location, while in other embodiments the processors may be distributed across a number of locations. The one or more processors may also operate to support performance of the relevant operations in a "cloud computing" environment or as a "software-as-a-service" (SaaS) service. For example, at least some of the operations may be performed by a group of computers (as examples of machines including processors), with these operations being accessible via a network (e.g., the Internet) and via one or more appropriate interfaces (e.g., Application Program Interfaces (APIs).)

As should be apparent from the foregoing discussion, various embodiments of the present invention may be implemented with the aid of computer-implemented processes or methods (i.e., computer programs or routines) or on any programmable or dedicated hardware implementing digital logic. Such processes may be rendered in any computer language, or on any programmable logic hardware. It should also be appreciated that the portions of this detailed description that are presented in terms of computer-implemented processes and symbolic representations of operations on data within a computer memory are in fact the preferred means used by those skilled in the computer science arts to most effectively convey the substance of their work to others skilled in the art. In all instances, the processes performed by the computer system are those requiring physical manipulations of physical quantities. The computer-implemented processes are usually, though not necessarily, embodied the form of electrical or magnetic information (e.g., bits) that is stored (e.g., on computer-readable storage media), transferred (e.g., via wired or wireless communication links), combined, compared and otherwise manipulated. It has proven convenient at times, principally for reasons of common usage, to refer to these signals as bits, values, elements, symbols, keys, numbers or the like. It should be borne in mind, however, that all of these and similar terms are to be associated with the appropriate physical quantities and are merely convenient labels applied to these quantities. Unless specifically stated otherwise, it should be appreciated that the use of terms such as processing, computing, calculating, determining, displaying or the like, refer to the action and processes of a computer system, or similar electronic computing device, that manipulates and transforms data represented as physical (electronic) quantities within the computer system's registers, memories and other storage media into other data similarly represented as physical quantities within the computer system memories, registers or other storage media.

Thus, network access points configured to identify applications running on computer-based devices, such as mobile phones, tablet computers, and the like, and to apply network administrator-directed policies to data communications by those applications according to application, location, context, device and/or user characteristics have been described.

What is claimed is:

1. A method of securing a WiFi computer network communicatively coupled to a second computer network via a WiFi network access point, the WiFi network access point managing access of one or more of a wireless device, a user of the wireless device and an application executing on the wireless device to the second computer network, the method comprising:
    identifying by the WiFi network access point one or more of (i) the application, (ii) the wireless device, (iii) a context within which the WiFi network access point is deployed, and (iv) the user;
    enforcing, at a WiFi network access point, network access policies, said network access policies dependent upon one or more of (i) an identity of the application, (ii) an identity of the wireless device, (iii) the context within which the WiFi network access point is deployed, and (iv) an identity of the user, as identified by the WiFi network access point;
    in response to the WiFi network access point recognizing the application executing on the wireless device as potentially malicious, sending an alert, by the WiFi network access point, to the wireless device so as to alert the user of the potentially malicious application; and
    preventing, by the WiFi network access point, out-of-band data communications from within a network coverage zone of the WiFi network access point from bypassing policy enforcements by the WiFi network access point, wherein the out-of-band data communications comprise data communications through a channel other than a WiFi communication channel for which the WiFi network access point provides policy enforcement.

2. The method of claim 1, wherein the network access policies enforced by the WiFi network access point are dependent on a location of the WiFi network access point.

3. The method of claim 1, further comprising reporting, by the WiFi network access point to a server communicatively coupled thereto, one or more of identifications of applications seeking to access the second computer network via the WiFi network access point, signatures of applications seeking to access the second computer network via the WiFi network access point, and behaviors of applications seeking to access the second computer network via the WiFi network access point.

4. The method of claim 1, further comprising receiving, by the WiFi network access point from a server communicatively coupled thereto, application signatures for use in connection with policy enforcement decisions regarding applications seeking to access the second computer network via the WiFi network access point.

5. The method of claim 1, wherein preventing the out-of-band data communications from bypassing policy enforcements comprises subjecting the out-of-band data communications to said policy enforcements.

6. A system, comprising an analytics engine communicatively coupled to a plurality of network access points, each respective network access point configured (i) to enforce policies on communications traversing the respective network access point, (ii) to provide information to the analytics engine concerning applications running on wireless devices associated with said communications and behaviors of said applications, (iii) to receive policy updates from said analytics engine, said policy updates being informed by said information concerning the applications and the behaviors of said applications, (iv) send an alert to at least one of the wireless devices so as to alert a user of a potentially malicious application executing on the at least one wireless device; and (v) prevent out-of-band data communications from within a network coverage zone of the network access point from bypassing policy enforcements by the network access point, wherein the out-of-band data communications comprise data communications through a channel other than a WiFi communication channel for which the network access point provides policy enforcement.

7. The system of claim 6, wherein each respective network access point is further configured to enforce policies according to said communications according to one or more of application identity, knowledge of the application identity and origin of an application publisher, security rating of the application publisher, application category, application popularity, known released versions or variants of an application, past histories of known compromises and rates of compromise of an application, application attributes, location of the respective network access point, context within which the respective network access point is accessed by an associated device, identity or kind of device accessing the respective network access point, and characteristics of a user of a device accessing the respective network access point.

8. The system of claim 6, wherein each respective network access point is configured to pull policy updates from said analytics engine.

9. The system of claim 6, wherein each respective network access point is configured to receive policy updates pushed from said analytics engine.

10. The method of claim 1, wherein sending an alert comprises sending an alert through an in-band communication to the wireless device.

11. The method of claim 1, wherein sending an alert comprises sending an alert through an out-of-band communication to the wireless device.

12. The method of claim 1, wherein sending an alert comprises sending a pop up message for display on a web browser of the wireless device.

13. The method of claim 1, wherein sending an alert comprises sending a text to the wireless device.

* * * * *